(12) United States Patent
Tchilinguirian

(10) Patent No.: US 6,588,543 B1
(45) Date of Patent: Jul. 8, 2003

(54) SPRING-LOADED DOG ASSEMBLY WHICH ENABLES A BEZEL OF A SPEAKER SYSTEM AND STRUCTURE HOLDING ELECTRIC DEVICE TO BE MOUNTED IN CEILINGS AND WALLS WITHOUT HAVING TO USE EXTERNAL RETAINING MEANS

(75) Inventor: Meguerditch John Tchilinguirian, Bowmanville (CA)

(73) Assignee: Audio Products International Corp., Scarborough (CA)

( * ) Notice: Subject to any disclaimer, the term of this patent is extended or adjusted under 35 U.S.C. 154(b) by 113 days.

(21) Appl. No.: 09/947,187

(22) Filed: Sep. 4, 2001

(51) Int. Cl.[7] .............................. H05K 5/00; H04R 1/02; F16B 21/00; F21V 15/00
(52) U.S. Cl. ..................... 181/150; 381/386; 381/87; 411/341; 411/342; 411/347; 362/364; 362/365; 362/147
(58) Field of Search ................................ 181/148, 150; 381/386, 395, 87; 362/364, 365, 366, 368, 370, 371, 147, 148; 411/340, 341, 342, 345, 347, 349

(56) References Cited

U.S. PATENT DOCUMENTS

| | | | | |
|---|---|---|---|---|
| 3,018,083 A | * | 1/1962 | Bobrick | 362/365 |
| 4,048,491 A | * | 9/1977 | Wessman | 362/364 |
| 4,815,558 A | | 3/1989 | Krainhofer | |
| 4,852,178 A | | 7/1989 | Inkman et al. | |
| 4,860,369 A | | 8/1989 | Koshimura et al. | |
| 4,941,071 A | * | 7/1990 | Knauf | 362/365 |
| 5,002,418 A | * | 3/1991 | McCown et al. | 403/24 |
| 5,221,069 A | | 6/1993 | Struthers et al. | |
| D341,592 S | | 11/1993 | Queen | |
| 5,331,119 A | | 7/1994 | Leger et al. | |
| 5,850,999 A | * | 12/1998 | Gross | 362/368 |
| 5,964,523 A | | 10/1999 | Eversberg | |
| 6,061,460 A | | 5/2000 | Seo | |
| 6,170,685 B1 | * | 1/2001 | Currier | 220/3.3 |
| 6,241,368 B1 | * | 6/2001 | Depino | 362/364 |
| 6,346,674 B1 | * | 2/2002 | Gretz | 174/58 |
| 6,487,299 B1 | * | 11/2002 | Peng | 181/150 |

* cited by examiner

Primary Examiner—Robert E. Nappi
Assistant Examiner—Edgardo San Martin
(74) Attorney, Agent, or Firm—Thomas I. Rozsa; Tony D. Chen

(57) ABSTRACT

A mounting bracket comprises a plurality of spring-loaded dog assemblies for retaining a bezel to a ceiling or wall of a building structure without having to use external attachments. Each dog assembly has a dog tower which is molded to the rear the bezel. The dog tower has a spiral slot opening on one side which enables a dog member to be placed therein and rotated down or up within the dog tower to clamp to the material of the wall or ceiling. A notch is provided on the spiral slot opening to fix the dog member in a pre-mounting position. The dog member has a dog post that fits inside of the dog tower, where a clamping dog leg extends from the side of the dog post and has a bump that mates with the notch on the dog tower to fix the dog member in the pre-mounting condition. A coil spring is inserted inside the dog tower and between the dog post and a bottom of the dog tower. A hole in the bezel centered in the dog tower accommodates a screw which is threaded into a threaded insert at the base of the dog post.

27 Claims, 5 Drawing Sheets

SPRING-LOADED DOG ASSEMBLY WHICH ENABLES A BEZEL OF A SPEAKER SYSTEM AND STRUCTURE HOLDING ELECTRIC DEVICE TO BE MOUNTED IN CEILINGS AND WALLS WITHOUT HAVING TO USE EXTERNAL RETAINING MEANS

BACKGROUND OF THE INVENTION

1. Field of the Invention

The present invention relates generally to the field of loudspeakers. More particularly, the present invention relates to the field of mounting brackets or the like which can be mounted into ceilings and walls of a building structure without using external retaining means.

2. Description of the Prior Art

Specifically, mounting brackets for speakers, lights, alarms, sensors etc. are well known in the art. These prior art mounting brackets are sometimes custom fabricated to make them fit into ceilings and walls of a building structure into which the devices are to be installed which involves a substantial number of steps that increase the time required to perform the installation, thereby increasing the associated cost. In addition, two or more installers are also required to install these devices to these prior art mounting brackets, and thereby also increase the associated cost.

The following nine (9) prior art patents are found to be pertinent to the field of the present invention:

1. U.S. Pat. No. 4,815,558 issued to Krainhöfer on Mar. 28, 1989 for "Device For Accommodating A Loudspeaker Into A Cut-Out Of A Sound Panel" (hereafter the "Krainhöfer");
2. U.S. Pat. No. 4,852,178 issued to Inkman et al. on Jul. 25, 1989 for "Speaker Retaining Assembly" (hereafter the "Inkman");
3. U.S. Pat. No. 4,860,369 issued to Koshimura et al. on Aug. 22, 1989 for "Flat Speaker Unit" (hereafter the "Koshimura");
4. U.S. Pat. No. 5,221,069 issued to Struthers et al. on Jun. 22, 1993 for "Telescoping Support Bracket" (hereafter the "Struthers");
5. U.S. Pat. No. 5,331,119 issued to Leger et al. on Jul. 19, 1994 for "Speaker Support Frame" (hereafter the "Leger");
6. U.S. Pat. No. 5,964,523 issued to Eversberg on Oct. 12, 1999 for "Remodel Recessed Light Fixture" (hereafter the "Eversberg");
7. U.S. Pat. No. 6,061,460 issued to Seo on May 9, 2000 for "Fixture Device Of Speaker Unit For Portable Computer" (hereafter the "Seo");
8. U.S. Design Pat. No. 341,592 issued to Queen on Nov. 23, 1993 for "Ceiling-Mounted Loudspeaker" (hereafter the "Queen"); and
9. French Patent No. 2,520,181 (hereafter the "French '181").

Krainhöfer discloses a device for accommodating a loudspeaker into a cut-out of a sound panel. The device is a speaker mounting system wherein a retaining ring secures the loudspeaker to a plate by turning the retaining ring.

Inkman discloses a speaker retaining assembly which includes a support unit and a retaining ring. The support unit has latches disposed thereon. The retaining ring functions to secure a speaker in place with respect to the support unit. The retaining ring includes an appropriately configured plurality of cavities which interact with the latches to secure the speaker thereto.

Koshimura discloses a flat speaker unit. The speaker unit has a spring loaded swinging blade that secures the mount to a wallboard. A coil spring is disposed between the back of the speaker frame and the swinging blade and at its opposite ends abuts against and is connected to the back of the speaker frame and the base end of the swinging blade. The coil spring is constantly biased in the axial direction of the swinging blade of the bolt by the spring force so that the movement of the swinging blade in the axial direction of the bolt is smooth.

Struthers discloses a telescoping support bracket. It includes an outer bezel attached to a tubular member to provide an opening for the speaker to be inserted thereto.

Leger discloses a speaker support frame which includes a plurality of pivoting leg members operated by a bolt and used to retain a speaker mount to an opening in a wallboard.

Eversberg discloses a remodel recessed light fixture. It includes a screw activated spring loaded pawl that is cam outwardly as the pawl moves down. There is also a torsion spring which engages the pawl.

Seo discloses a fixing device of a speaker-unit for a portable computer. The speaker is retained in a recess by rotating a speaker fixing member.

Queen discloses a ceiling-mounted loudspeaker.

French '181, as disclosed from the figures shows a speaker mounted having swinging retaining tabs.

It is highly desirable to have a very efficient and also very effective design and construction of a mounting bracket which utilizes a plurality of spring-loaded dog assemblies for retaining a bezel to a wall or ceiling of a building structure in a much more efficient way than prior art mounting brackets. Unlike the prior air, the bezel with its spring-loaded dog assemblies provides rapid installation and secure clamping means to the wall or ceiling while simultaneously projecting screws for accommodating a fixture or baffle installation, without the use of any tools and without requiring the installer to hold additional bolts, screws or other retaining means while securing the bezel to the wall or ceiling and the baffle to the bezel.

SUMMARY OF THE INVENTION

The present invention is a mounting bracket which comprises a plurality of spring-loaded dog assemblies for retaining a bezel to a ceiling or wall of a building stricture without having to use external attachment means.

The plurality of spring-loaded dog assemblies enable a flush mounted ceiling baffle or wall baffle to be installed safely and securely by one installer without assistance from anyone else and without requiring the installer to hold tools, additional screws, bolts etc. while installing the baffle to the bezel.

Each spring-loaded dog assembly has a hollow dog tower which is molded to the rear of the bezel. This dog tower has a spiral slot opening on one side which enables a dog member to be placed therein and rotated down or up within the dog tower to clamp to the material of the wall or ceiling. A notch is provided on the spiral slot opening to fix the dog member in a pre-mounting position. The dog member has a dog post that fits inside of the dog tower, where a clamping dog leg extends from the side of the dog post and has a bump that mates with the notch on the dog tower to fix the dog member in the pre-mounting condition. A coil spring is inserted inside the dog tower and between the dog post and a bottom of the dog tower. A hole in the bezel centered in the dog tower accommodates a baffle screw, which is then threaded into a threaded insert at the base of the dog post. The baffle screw serves two purposes, it provides the axial lock for the dog member's smooth rotation and it enables ceiling fixtures or wall fixtures to be securely mounted to the bezel.

It is an object of the present invention to provide a bezel with a plurality of spring-loaded dog assemblies so that the bezel can be mounted to a ceiling or wall of a building structure without having to use external retaining means.

It is an additional object of the present invention to provide a bezel with a plurality of spring-loaded assemblies so that a flush mounted ceiling or wall baffle can be safely and securely installed within the bezel by one installer without assistance from anyone and without requiring the installer to hold tools, additional screws, bolts or etc. while installing the baffle to the bezel.

It is a further object of the present invention to provide a bezel with a plurality of spring-loaded dog assemblies for providing rapid installation and clamping means to a wall or ceiling while simultaneously projecting baffle screws for accommodating a baffle installation.

In the preferred embodiment of the present invention, the mounting bracket comprises a bezel which is generally a rectangular shape for mounting to a wall of a building structure. The bezel has at least six spring-loaded dog assemblies.

In an alternative embodiment of the present invention, the mounting bracket comprises a bezel which is generally a circular shape for mounting to a ceiling of a building structure. The bezel has at least four spring-loaded dog assemblies.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

Although specific embodiments of the present invention will now be described with reference to the drawings, it should be understood that such embodiments are byway of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
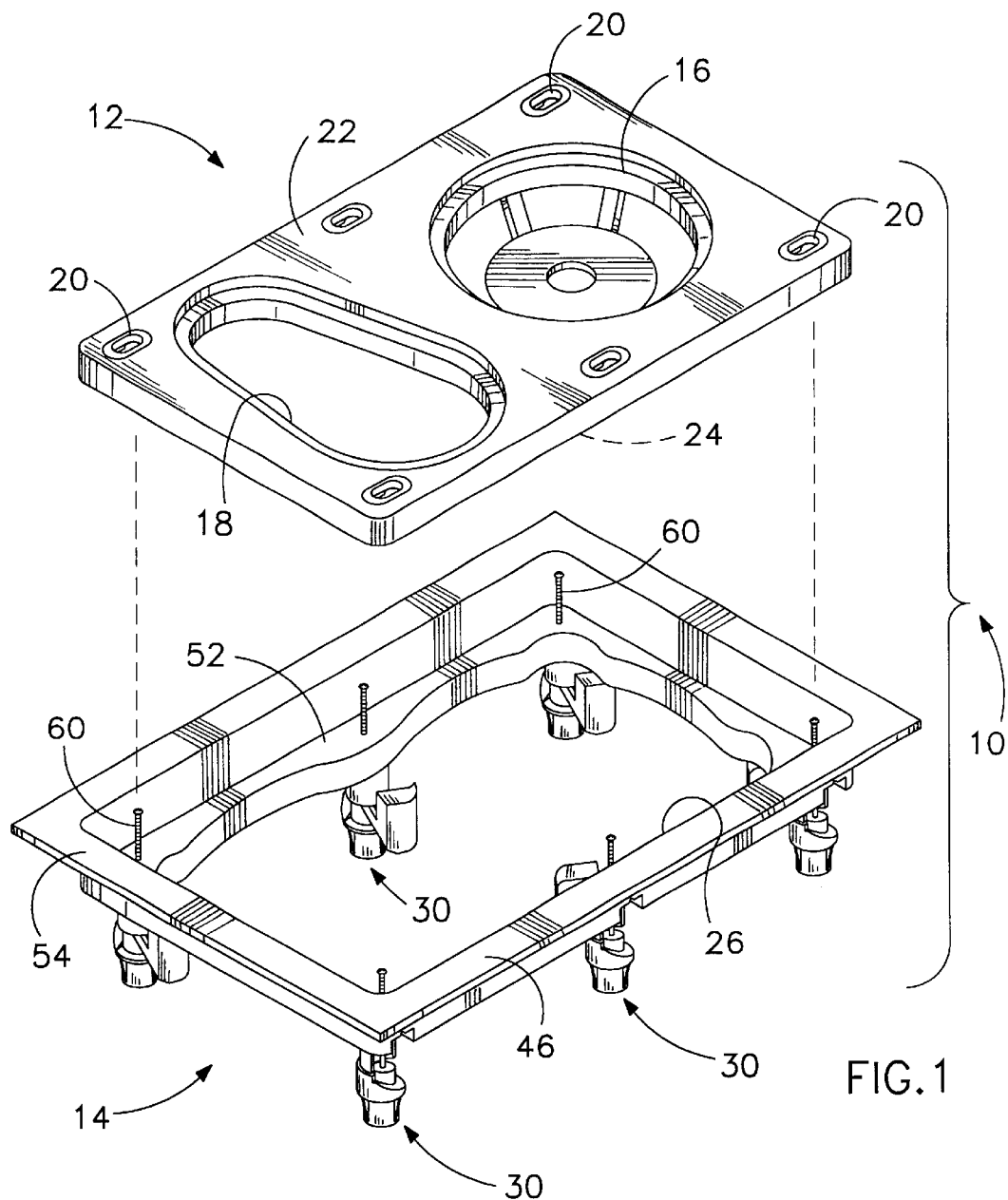
FIG. 1 is an exploded perspective view of the preferred embodiment of the present invention mounting bracket showing a generally rectangular shaped bezel for mounting to a wall surface board and a generally rectangular shaped fixture for mounting within the bezel.

Referring to FIG. 1, there is shown at 10 a preferred embodiment of the present invention mounting bracket which enables a flush mounted ceiling fixture or baffle and a wall fixture or baffle to be safely and securely installed by one installer without assistance from anyone else and without requiring the installer to hold tools, additional screws, bolts or etc. while installing the baffle to the bezel.

Figure 2:
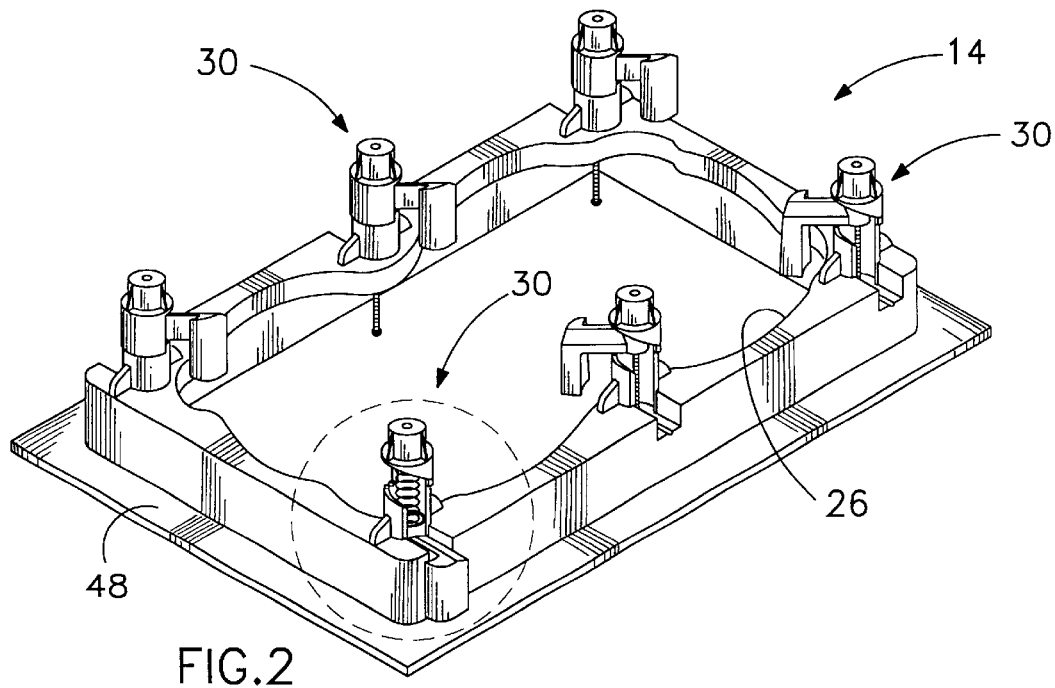
FIG. 2 is a rear perspective view of the bezel shown in FIG. 1.

Referring to FIGS. 1 and 2, the mounting bracket 10 comprises a generally rectangular shaped fixture or baffle 12 and a generally rectangular shaped bezel 14, where the baffle 12 is sized to fit within the bezel 14. The baffle 12 comprises a woofer opening 16 located on one side, and a tweeter and midrange opening 18 located on the other side for securing a speaker system therein. The baffle 12 further comprises a front side 22, a rear side 24, and a plurality of spaced apart slotted keyholes 20 extending therethrough and located on the periphery of the baffle 12 for accommodating and locking fixture screws 60 thereto. These slotted keyholes 20 are recessed below the surface of the front side 22 of the baffle 12 so that the fixture screws 60 do not protrude above the surface of the baffle 12.

It will be appreciated that the rectangular shaped baffle 12 is not limited to the openings 16 and 18 as illustrated. It is emphasized that while the openings are configured for retaining a speaker system thereto, it is also within the spirit and scope of the present invention to utilize different configurations of the openings 16 and 18 for retaining and securing can lights, alarms, sensors or other flush mounted equipment not shown.

Figure 3:
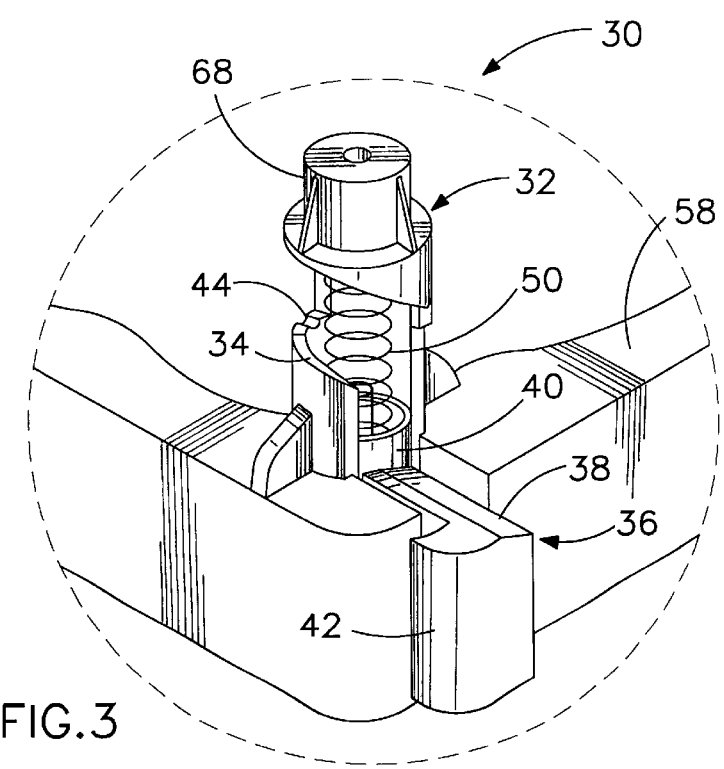
FIG. 3 is an enlarged perspective view of one of the plurality of spring-loaded dog assemblies taken within the dashed lines of FIG. 2, showing an installed condition.

Referring to FIGS. 1, 2 and 3, the bezel 14 comprises a front side 46, a rear side 48, a recess opening 26, a lower ledge 52 which surrounds the recess opening 26, and an upper ledge 54 which surrounds the lower ledge 52 and the recess opening 26. The lower ledge 52 has a plurality of spaced apart apertures 26 extending therethrough for accommodating the fixture screws 60. The baffle 12 is sized to fit within the recess opening 26 of the bezel 14 such that the baffle 12 rests on the lower ledge 52 and below the upper ledge 54.

Referring to FIGS. 2, 3, 4 and 5, the bezel 14 further comprises a plurality of spring-loaded dog assemblies 30. Preferably at least six spring-loaded dog assemblies are utilized with this configuration of the bezel 14. By way of example, depending on the size and weight of the baffle 12 to be installed within the bezel 14, a small eight inch speaker may require only four spring-loaded dog assemblies, while a large heavy, four-way loudspeaker system may require eight spring-loaded dog assemblies. All spring-loaded dog assemblies 30 are preferably identical in construction, and to the extent they are, only one will be described in detail. Each spring-loaded dog assembly 30 has a hollow cylindrical dog tower 32, a movable dog member 36, a coil spring 50, and a fixture or baffle screw or retaining means 60. The hollow cylindrical dog tower 32 has a top end which is integrally molded to a rear surface 58 of the lower ledge 52 and located on the rear side 48 of the bezel 14. The dog tower 32 has a spiral slot opening 34 which enables the movable dog member 36 to be placed therein and rotatable up or down within the dog tower 32 for clamping to a material of the wall or ceiling 2 (see FIG. 7). The dog tower 32 further has a notch 44 situated at the beginning or the end of the spiral slot opening 34 for securing the movable dog member 36 in a pre-mounting position. The movable dog member 36 has a connecting section 38, a hollow cylindrical dog post 40 which is integrally formed at one end of the connecting section 38 and movable within the dog tower 32, and a clamping dog leg 42 which is integrally formed at the other end of the connecting section 38, where the cylindrical dog post 40 and the clamping dog leg 42 extend in opposite directions. The connecting section 38 has an engagement ridge 66 which extends the length of the connecting section and mates with the notch 44 on the dog tower 32 for securing the movable dog member 36 in the pre-mounting condition. The coil spring 50 is inserted inside the dog tower 32 such that the ends of the coil spring 50 abut against a cap 68 located at the bottom of the dog tower 32 and a cavity 70 within the dog post 40, where the coil spring 50 is in a compressed condition in the pre-installation condition and in an uncompressed condition in an installed condition. The apertures 56 in the bezel 14, centered in the dog towers 32, accommodates the baffle screws 60 which are threaded into threaded metal inserts 64 located at the base of the dog post 40. The baffle screw 60 serves two purposes, it provides the axial lock for the dog's smooth rotation and it enables ceiling and wall fixtures to be securely mounted to the bezel. The other ends of the baffle screw 60 are respectively inserted into the slotted keyholes 20 of the baffle 12, where the baffle 12 is shifted so that the baffle screws provide an axial lock for retaining the securing the rectangular shaped baffle to the bezel.

The baffle screw 60 is pushed flush against the baffle 12. This causes the coil spring 50 to be in the compressed state and the dog member 36 to be in the inactivated condition. It is also noted that the baffle screw 60 is now in the extended position (see FIG. 7) and extends so that it is not flush against the baffle 12 and the compression force of the coil spring 50 causes the spring loaded dog member to move downwardly and be in the engaged position.

The present invention has many advantageous features including: (a) the spring-loaded dog assemblies provide rapid installation and secure clamping means to the wall or ceiling while simultaneously projecting a screw for accommodating the baffle installation, without the use any tools and without requiring the installer to hold additional bolts, screws or other retaining means while securing the bezel to the wall or ceiling and the fixture to the bezel; and (b) only one installer is required to install these devices to the wall or ceiling of the building structure, thereby decreasing the associated cost.

Figure 6:
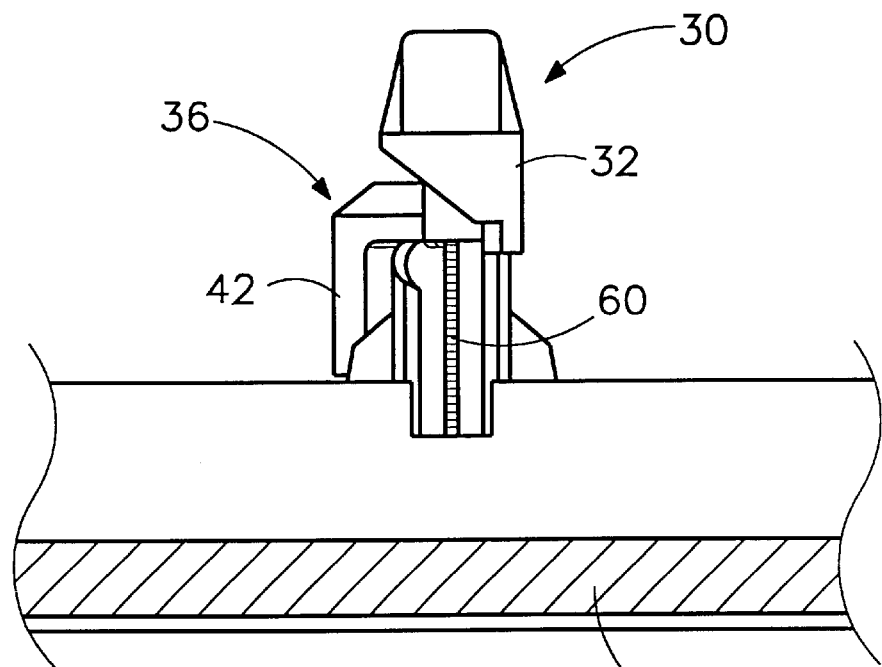
FIG. 6 is a side elevational view of one of the plurality of spring loaded dog assemblies in accordance with the present invention, showing a pre-mounting condition.
Figure 7:
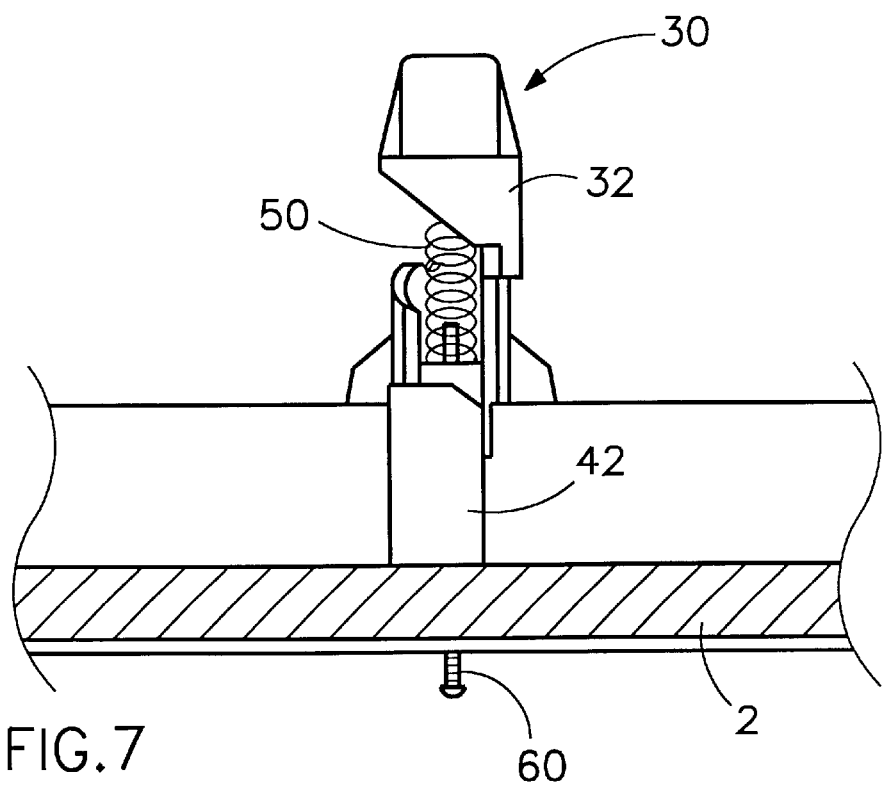
FIG. 7 is a side elevational view of one of the plurality of spring loaded dog assemblies in accordance with the present invention showing a mounting condition, wherein the bezel is mounted and secured to a wall surface board by the clamping dog leg.

Referring to FIGS. 6 and 7, the operation of the foregoing embodiment now will be described. When the installer takes the bezel 14 (with all movable dog members 36 rotated to their pre-mounting positions and locked in place by the notches 44) and puts it in the hole in the wall or ceiling 2, the bezel 14 fits flush with the surface of the wall or ceiling 2. The installer then reaches inside the bezel 14 through the recess opening 26 and pushes each movable dog member 36 past the notch 44 on the dog tower 32, the coiled spring 50 then forces the dog member to spiral around on the spiral slot opening 34 of the dog tower 32 and firmly and securely clamp the wall/ceiling material. The spring motion has also forced the fixture screw 60 out of the bezel 14, providing a secure mount for the baffle 12. The spring loaded dog assembly 30 enables the installer to let go of the installed bezel 14, pick up the baffle 12 and slide the baffle slotted keyholes 20 over the fixture screws 60, pushing the baffle 12 into place and secured thereto by tightening the fixture screws 60 to the baffle 12. The screws 60 extend a sufficient distance beyond the upper ledge surface 54 so that the rectangular baffle 12 can have the screws inserted into the respective large opening of the keyhole slot and then moved horizontally into the narrow portion of the keyhole slot 20 so that the baffle 12 is completely aligned with the bezel 14 before the baffle 12 is pushed into the bezel 14 and the screws tightened. The entire mounting bracket 10 is now secure into the wall or ceiling 2. The installer can choose to tighten the fixture screws 60 at his or her leisure, since the combined bezel and baffle are held in the wall or ceiling 2 by the spring-loaded dog assemblies 30.

Should the installer need to remove the baffle 12 for any reason, the process can be reversed quite easily. First, the installer loosens the fixture screws 60 enough that the fixture 12 can be slid back to the keyhole position, and then the fixture is removed from the projecting fixture screws 60. If the installer wishes to also remove the bezel 14, the installer simply pushes the fixture screws 60 towards the bezel 14. This compresses the coil spring 50 and forces the clamping dog leg 42 to spiral up through the spiral slot opening 34, over the notch 44 and locks the movable dog member 36 back into the pre-mounting position. When all of the movable dog members 36 have been rotated back to their pre-mounting positions, the bezel 14 can then be removed from the hole in the wall or ceiling 2.

The present invention conforms to conventional forms of manufacture or any other conventional way known to one skilled in the art.

Figure 9:
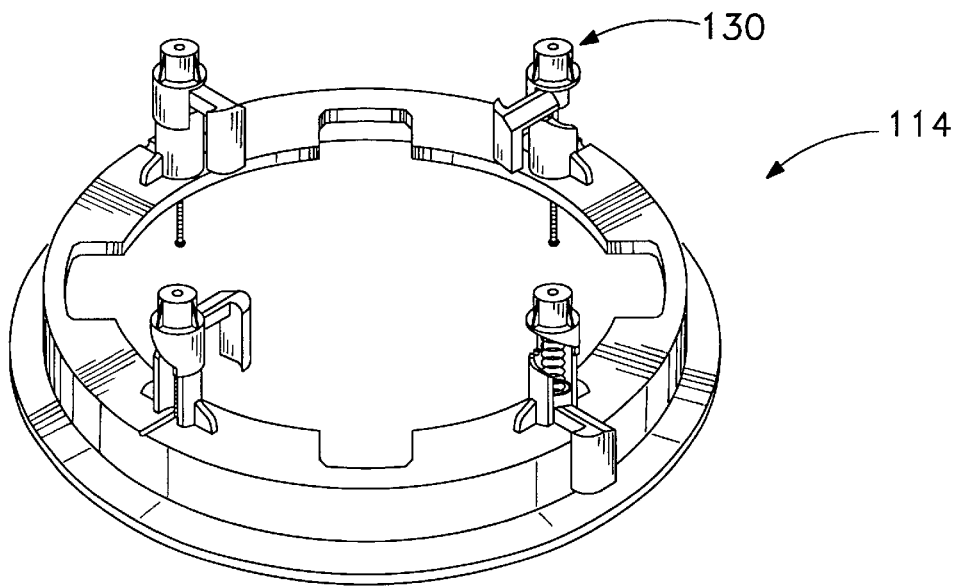
FIG. 9 is a rear perspective view of the bezel shown in FIG. 8.
Figure 4:
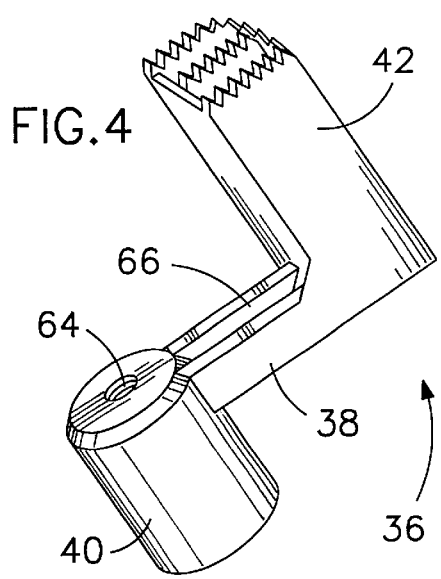
FIG. 4 is an enlarged perspective view of one of the movable dog members in accordance with the present invention.
Figure 5:
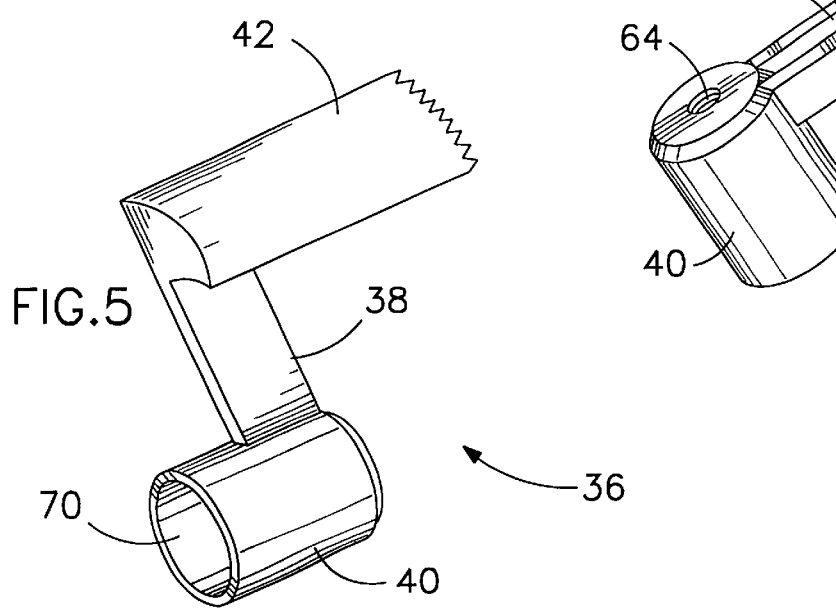
FIG. 5 is another enlarged perspective view of one of the movable dog members in accordance with the present invention.
Figure 8:
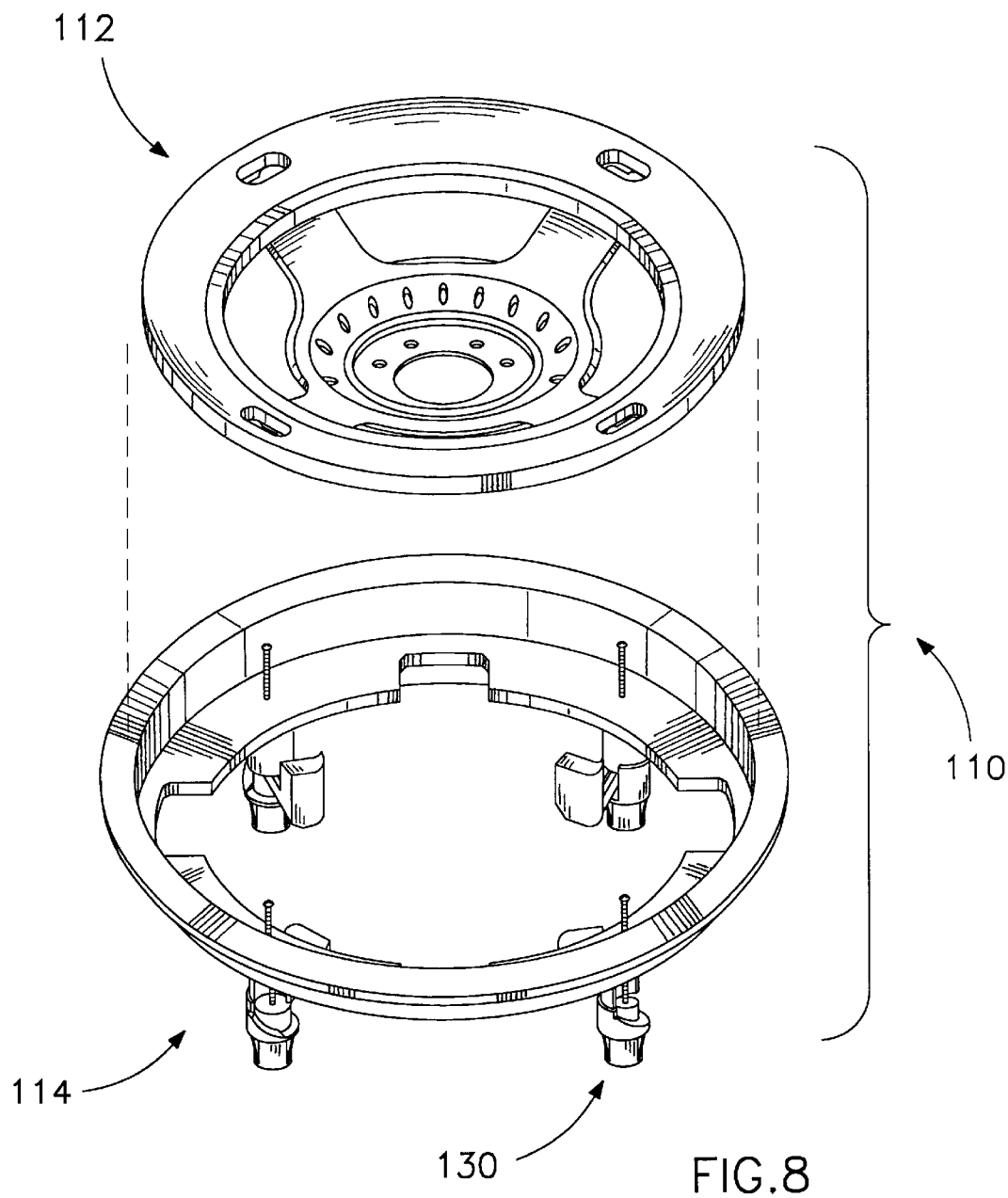
FIG. 8 is an exploded perspective view of an alterative embodiment of the present invention mounting bracket showing a generally circular shaped bezel for mounting to a ceiling and a generally circular shaped fixture for mounting within the bezel.

Referring to FIGS. 8 and 9, there is shown at 110 an alternative embodiment of the present invention mounting bracket. In this embodiment, the mounting bracket 110 comprises at least four spring-loaded dog assemblies 130 for securing the mounting bracket 110 to a ceiling of a building structure. Since this alternative embodiment assembles and functions the same as in the preceding embodiment described above except that the circular shaped fixture or baffle 112 and the circular shaped bezel 114 are substituted for the rectangular shaped baffle 12 and the rectangular shaped bezel 14 shown in FIGS. 1 and 2, and the description thereof will not be repeated. The baffle 112 can be used to house a speaker or alternatively can be used to house a can light.

Although not discussed in detail, it will be appreciated that the entire assembly as illustrated in detail in FIGS. 2, 3, 4 and 5 is positioned on the lower surface of the circular bezel the same way it is positioned on the rectangular bezel but in this case, it is positioned usually in at least two locations on opposite sides of the circular bezel and preferably, at four locations located ninety degrees apart on the circular bezel. In addition, the device is installed in the ceiling (or wall) the same way as depicted in FIGS. 6 and 7 and as discussed in detail.

In most conventional applications, the rectangular shape assembly is used for installation in a wall and the circular assembly is used for installation in a ceiling. However, it is within the spirit and scope of the present invention to also have the rectangular shape structure installed within a ceiling and the circular shape structure installed within a wall.

Defined in detail, the present invention is a mounting bracket for mounting a speaker system to a wall or ceiling of a building structure, the mounting bracket comprising: (a) a generally rectangular shaped bezel having a front side, a rear side, a recess opening, a lower ledge surrounding the recess opening, and an upper ledge surrounding the lower ledge and the recess opening, the lower ledge having a plurality of spaced apart apertures therethrough; (b) a plurality of spring-loaded dog assemblies, each having a hollow cylindrical dog tower integrally formed to a bottom surface of the lower ledge on the rear side of the bezel, the dog tower having a spiral slot opening on one side which enables a movable dog member to be placed therein and rotatable up or down within the dog tower for clamping to a material of the wall or ceiling, the dog tower further having a notch located on the spiral slot opening for securing the movable dog member in a pre-mounting condition; (c) the movable dog member having a connecting section, a cylindrical dog post integrally formed at one end of the connecting section and movable within the dog tower, and a clamping dog leg integrally formed at the other end of the connecting section, where the cylindrical dog post and the clamping dog leg extend in opposite directions, the connecting section having a ridge which mates with the notch on the dog tower for securing the movable dog member in the pre-mounting condition; (d) a coil spring inserted within the dog tower of the each spring-loaded assembly and located between a bottom of the dog tower and one end of the cylindrical dog post, where the coil spring is in a compressed condition in the pre-mounting condition and in an uncompressed condition in a mounting condition; (e) a generally rectangular shaped fixture sized to fit within the recess opening of the bezel such that the fixture rests on the lower ledge and below the upper ledge, the fixture having a front side, a rear side and a plurality of spaced apart slotted keyholes extending therethrough; and (f) a plurality of fixture screws, each fixture screw having one end inserted through the each aperture on the lower ledge of the bezel and threaded into an insert within the cylindrical dog post, the other end of the each fixture screw inserted into the each slotted keyhole on the fixture which provides an axial lock for retaining and securing the fixture to the bezel; (g) whereby when an installer takes the bezel and puts the bezel in a hole in the wall or ceiling, the bezel fits flush with the surface of the wall or ceiling, the installer reaches inside the bezel and pushes the movable dog member of the each spring-loaded dog assembly past the notch on the dog tower, the coiled spring then forces the dog leg to spiral around the spiral slot opening and firmly and securely clamps the material of the wall or ceiling and spring motion forces the each fixture screw out of the bezel, where the each fixture screw is screwed to secure the fixture to the bezel.

Also defined in detail, the present invention is a mounting bracket for mounting a speaker system to a wall or ceiling of a building structure, the mounting bracket comprising: (a) a generally circular shaped bezel having a front side, a rear side, a recess opening, a lower ledge surrounding the recess opening, and an upper ledge surrounding the lower ledge and the recess opening, the lower ledge having a plurality of spaced apart apertures therethrough; (b) a plurality of spring-loaded dog assemblies, each having a hollow cylindrical dog tower integrally formed to a bottom surface of the lower ledge on the rear side of the bezel, the dog tower having a spiral slot opening on one side which enables a movable dog member to be placed therein and rotatable up or down within the dog tower for clamping to a material of the wall or ceiling, the dog tower further having a notch located on the spiral slot opening for securing the movable dog member in a pre-mounting condition; (c) the movable dog member having a connecting section, a cylindrical dog post integrally formed at one end of the connecting section and movable within the dog tower, and a clamping dog leg integrally formed at the other end of the connecting section, where the cylindrical dog post and the clamping dog leg extend in opposite directions, the connecting section having a ridge which mates with the notch on the dog tower for securing the movable dog member in the pre-mounting condition; (d) a coil spring inserted within the dog tower of the each spring-loaded assembly and located between a bottom of the dog tower and one end of the cylindrical dog post, where the coil spring is in a compressed condition in the pre-mounting condition and in an uncompressed condition in a mounting condition; (e) a generally circular shaped fixture sized to fit within the recess opening of the bezel such that the fixture rests on the lower ledge and below the upper ledge, the fixture having a front side, a rear side and a plurality of spaced apart slotted keyholes extending therethrough; and (f) a plurality of fixture screws, each fixture screw having one end inserted through the each aperture on the lower ledge of the bezel and threaded into an insert within the cylindrical dog post, the other end of the each fixture screw inserted into the each slotted keyhole on the fixture which provides an axial lock for retaining and securing the fixture to the bezel; (g) whereby when an installer takes the bezel and puts the bezel in a hole in the wall or ceiling, the bezel fits flush with the surface of the wall or ceiling, the installer reaches inside the bezel and pushes the movable dog member of the each spring-loaded dog assembly past the notch on the dog tower, the coiled spring then forces the dog leg to spiral around the spiral slot opening and firmly and securely clamps the material of the wall or ceiling and spring motion forces the each fixture screw out of the bezel, where the each fixture screw is screwed to secure the fixture to the bezel.

Defined broadly, the present invention is a mounting bracket for mounting an object to a wall or ceiling of a building structure, the mounting bracket comprising: (a) a bezel having a recess opening, a lower ledge surrounding the recess opening, and an upper ledge surrounding the lower ledge and the recess opening, the lower ledge having a plurality of apertures therethrough; (b) a plurality of spring-loaded dog assemblies, each having a dog tower formed to the lower ledge of the bezel, the dog tower having a spiral slot opening on one side which enables a movable dog member to be placed therein and rotatable up or down within the dog tower for clamping to a material of the wall or ceiling, the dog tower further having means for securing the movable dog member in a pre-mounting condition; (c) the movable dog member having a connecting section, a dog post formed at one end of the connecting section and movable within the dog tower, and a clamping dog leg formed at the other end of the connecting section, the connecting section having a protrusion which mates with the securing means on the dog tower for securing the movable dog member in the pre-mounting condition; (d) spring means inserted within the dog tower of the each spring-loaded assembly and located between a bottom of the dog tower and the dog post, where the spring means is in a compressed condition in the pre-mounting condition and in an uncompressed condition in a mounting condition; (e) a fixture positioned within the recess opening of the bezel such that the fixture rests on the lower ledge and below the upper ledge, the fixture having a plurality of slotted keyholes extending therethrough; and (f) a plurality of screws, each screw having one end inserted through the each aperture on the lower ledge of the bezel and threaded into the dog post, the other end of the each screw inserted into the each slotted keyhole on the fixture which provides an axial lock for retaining and securing the fixture to the bezel; (g) whereby when an installer takes the bezel and puts the bezel in a hole in the wall or ceiling, the bezel fits flush with the surface of the wall or ceiling, the installer reaches inside the bezel and pushes the movable dog member of the each spring-loaded dog assembly past the securing means on the dog tower, the spring means then forces the dog leg to spiral around the spiral slot opening and firmly and securely clamps the material of the wall or ceiling and spring motion forces the each screw out of the bezel, where the each screw is screwed to secure the fixture to the bezel.

Defined more broadly, the present invention is a mounting bracket for mounting an object to a wall or ceiling of a building structure, the mounting bracket comprising: (a) a bezel having a recess opening and at least two apertures therethrough; (b) at least two spring-loaded dog assemblies, each having a dog tower attached to the bezel, the dog tower having a spiral slot opening which enables a dog member to be placed therein and rotatable up or down within the dog tower for clamping to a material of the wall or ceiling, the dog tower further having means for securing the dog member in a pre-mounting condition; (c) the dog member having a connecting section, a dog post attached at one end of the connecting section and a dog leg attached at the other end of the connecting section, the connecting section having a protrusion which mates with the securing means on the dog tower for securing the dog member in the pre-mounting condition; (d) spring means inserted within the dog tower of the each spring-loaded assembly and between a base of the dog tower and the dog post, where the spring means is in a compressed condition in the pre-mounting condition and in an uncompressed condition in a mounting condition; (e) a baffle positioned within the recess opening of the bezel such that the baffle is almost within the bezel and having a plurality of slotted openings extending therethrough; and (f) at least two retaining means, each retaining means having one end inserted through the each aperture on the bezel and attached to the dog post, and the other end inserted into the each slotted opening on the baffle for retaining and securing the baffle to the bezel; (g) whereby when an installer takes the bezel and puts the bezel in a hole in the wall or ceiling, the bezel fits flush with the surface of the wall or ceiling, the installer reaches inside the bezel and pushes the dog member of the each spring-loaded dog assembly past the securing means on the dog tower, the spring means then forces the dog leg to spiral around the spiral slot opening and firmly and securely clamps the material of the wall or ceiling and spring motion forces the each retaining means out of the bezel, where the each retaining means secures the baffle to the bezel.

Further defined in detail, the present invention is a spring-loaded dog assembly used in conjunction with a bezel and a fixture for mounting a speaker system to a wall or ceiling of a building structure, the spring-loaded dog assembly comprising: (a) a hollow cylindrical dog tower integrally formed to a bottom surface of the bezel and having a spiral slot opening on one side which enables a movable dog member to be placed therein and rotatable up or down within the dog tower for clamping to a material of the wall or ceiling, the dog tower further having a notch located on the spiral slot opening for securing the movable dog member in a pre-mounting condition; (b) the movable dog member having a connecting section, a cylindrical dog post integrally formed at one end of the connecting section and movable within the dog tower, and a clamping dog leg integrally formed at the other end of the connecting section, where the cylindrical dog post and the clamping dog leg extend in opposite directions, the connecting section having a ridge which mates with the notch on the dog tower for securing the movable dog member in the pre-mounting condition; (c) a coil spring inserted within the dog tower and located between a bottom of the dog tower and one end of the cylindrical dog post, where the coil spring is in a compressed condition in the pre-mounting condition and in an uncompressed condition in a mounting condition; and (d) a fixture screw having one end inserted through an aperture on the bezel and threaded into an insert within the cylindrical dog post, and the other end inserted into a slotted keyhole on the fixture which provides an axial lock for retaining and securing the fixture to the bezel; (e) whereby when an installer takes the bezel and puts the bezel in a hole in the wall or ceiling, the bezel fits flush with the surface of the wall or ceiling, the installer reaches inside the bezel and pushes the movable dog member past the notch on the dog tower, the coiled spring then forces the dog leg to spiral around the spiral slot opening and firmly and securely clamps the material of the wall or ceiling and spring motion forces the fixture screw out of the bezel, where the fixture screw is screwed to secure the fixture to the bezel.

Further defined broadly, the present invention is a spring-loaded dog assembly used in conjunction with a bezel and a fixture for mounting an object to a wall or ceiling of a building structure, the spring-loaded dog assembly comprising: (a) a dog tower attached to the bezel and having a spiral slot opening on one side which enables a movable dog member to be placed therein and rotatable up or down within the dog tower for clamping to a material of the wall or ceiling, the dog tower further having means for securing the movable dog member in a pre-mounting condition; (b) the movable dog member having a connecting section, a dog post formed at one end of the connecting section and movable within the dog tower, and a clamping dog leg formed at the other end of the connecting section, the connecting section having a protrusion which mates with the securing means on the dog tower for securing the movable dog member in the pre-mounting condition; (c) spring means inserted within the dog tower and located between a bottom of the dog tower and the dog post, where the spring means is in a compressed condition in the pre-mounting condition and in an uncompressed condition in a mounting condition; and (d) a screw having one end inserted through an aperture on the bezel and threaded into the dog post, and the other end inserted into a slotted keyhole on the fixture which provides an axial lock for retaining and securing the fixture to the bezel; (e) whereby when an installer takes the bezel and puts the bezel in a hole in the wall or ceiling, the bezel fits flush with the surface of the wall or ceiling, the installer reaches inside the bezel and pushes the movable dog member past the securing means on the dog tower, the spring means then forces the dog leg to spiral around the spiral slot opening and firmly and securely clamps the material of the wall or ceiling and spring motion forces the screw out of the bezel, where the screw is screwed to secure the fixture to the bezel.

Further defined more broadly, the present invention is a spring-loaded dog assembly used in conjunction with a bezel and a baffle for mounting an object to a wall or ceiling of a building structure, the spring-loaded dog assembly comprising: (a) a dog tower attached to the bezel and having a spiral slot opening which enables a dog member to be placed therein and rotatable up or down within the dog tower for clamping to a material of the wall or ceiling, the dog tower further having means for securing the dog member in a pre-mounting condition; (b) the dog member having a connecting section, a dog post attached at one end of the connecting section and a dog leg attached at the other end of the connecting section, the connecting section having a protrusion which mates with the securing means on the dog tower for securing the dog member in the pre-mounting condition; (c) spring means inserted within the dog tower and between a base of the dog tower and the dog post, where the spring means is in a compressed condition in the pre-mounting condition and in an uncompressed condition in a mounting condition; and (d) retaining means having one end inserted through an aperture on the bezel and attached the dog post, and the other end inserted into a slotted opening on the baffle for retaining and securing the baffle to the bezel; (e) whereby when an installer takes the bezel and puts the bezel in a hole in the wall or ceiling, the bezel fits flush with the surface of the wall or ceiling, the installer reaches inside the bezel and pushes the dog member past the securing means on the dog tower, the spring means then forces the dog leg to spiral around the spiral slot opening and firmly and securely clamps the material of the wall or ceiling and spring motion forces the retaining means out of the bezel, where the retaining means secures the baffle to the bezel.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

The present invention has been described in considerable detail in order to comply with the patent laws by providing full public disclosure of at least one of its forms. However, such detailed description is not intended in any way to limit the broad features or principles of the present invention, or the scope of the patent to be granted. Therefore, the invention is to be limited only by the scope of the appended claims.

What is claimed is:

1. A mounting bracket for mounting a speaker system to a wall or ceiling of a building structure, the mounting bracket comprising:

a. a generally rectangular shaped bezel having a front side, a rear side, a recess opening, a lower ledge surrounding the recess opening, and an upper ledge surrounding the lower ledge and the recess opening, the lower ledge having a plurality of spaced apart apertures therethrough;

b. a plurality of spring-loaded dog assemblies, each having a hollow cylindrical dog tower integrally formed to a bottom surface of said lower ledge on said rear side of said bezel, the dog tower having a spiral slot opening on one side which enables a movable dog member to be placed therein and rotatable up or down within the dog tower for clamping to a material of the wall or ceiling, the dog tower further having a notch located on the spiral slot opening for securing the movable dog member in a pre-mounting condition;

c. said movable dog member having a connecting section, a cylindrical dog post integrally formed at one end of the connecting section and movable within said dog tower, and a clamping dog leg integrally formed at the other end of the connecting section, where the cylindrical dog post and the clamping dog leg extend in opposite directions, the connecting section having a ridge which mates with said notch on said dog tower for securing said movable dog member in the pre-mounting condition;

d. a coil spring inserted within said dog tower of said each spring-loaded assembly and located between a bottom of said dog tower and one end of said cylindrical dog post, where the coil spring is in a compressed condition in the pre-mounting condition and in an uncompressed condition in a mounting condition;

e. a generally rectangular shaped fixture sized to fit within said recess opening of said bezel such that the fixture rests on said lower ledge and below said upper ledge, the fixture having a front side, a rear side and a plurality of spaced apart slotted keyholes extending therethrough; and f. a plurality of fixture screws, each fixture screw having one end inserted through said each aperture on said lower ledge of said bezel and threaded into an insert within said cylindrical dog post, the other end of said each fixture screw inserted into said each slotted keyhole on said fixture which provides an axial lock for retaining and securing said fixture to said bezel;

g. whereby when an installer takes said bezel and puts said bezel in a hole in said wall or ceiling, said bezel fits flush with the surface of the wall or ceiling, the installer reaches inside said bezel and pushes said movable dog member of said each spring-loaded dog assembly past said notch on said dog tower, said coiled spring then forces said dog leg to spiral around said spiral slot opening and firmly and securely clamps the material of said wall or ceiling and spring motion forces said each fixture screw out of said bezel, where said each fixture screw is screwed to secure said fixture to said bezel.

2. A mounting bracket for mounting a speaker system to a wall or ceiling of a building structure, the mounting bracket comprising:

a. a generally circular shaped bezel having a front side, a rear side, a recess opening, a lower ledge surrounding the recess opening, and an upper ledge surrounding the lower ledge and the recess opening, the lower ledge having a plurality of spaced apart apertures therethrough;

b. a plurality of spring-loaded dog assemblies, each having a hollow cylindrical dog tower integrally formed to a bottom surface of said lower ledge on said rear side of said bezel, the dog tower having a spiral slot opening on one side which enables a movable dog member to be placed therein and rotatable up or down within the dog tower for clamping to a material of the wall or ceiling, the dog tower further having a notch located on the spiral slot opening for securing the movable dog member in a pre-mounting condition;

c. said movable dog member having a connecting section, a cylindrical dog post integrally formed at one end of the connecting section and movable within said dog tower, and a clamping dog leg integrally formed at the other end of the connecting section, where the cylindrical dog post and the clamping dog leg extend in opposite directions, the connecting section having a ridge which mates with said notch on said dog tower for securing said movable dog member in the pre-mounting condition;

d. a coil spring inserted within said dog tower of said each spring-loaded assembly and located between a bottom of said dog tower and one end of said cylindrical dog post, where the coil spring is in a compressed condition in the pre-mounting condition and in an uncompressed condition in a mounting condition;

e. a generally circular shaped fixture sized to fit within said recess opening of said bezel such that the fixture rests on said lower ledge and below said upper ledge, the fixture having a front side, a rear side and a plurality of spaced apart slotted keyholes extending therethrough; and f. a plurality of fixture screws, each fixture screw having one end inserted through said each aperture on said lower ledge of said bezel and threaded into an insert within said cylindrical dog post, the other end of said each fixture screw inserted into said each slotted keyhole on said fixture which provides an axial lock for retaining and securing said fixture to said bezel;

g. whereby when an installer takes said bezel and puts said bezel in a hole in said wall or ceiling, said bezel fits flush with the surface of the wall or ceiling, the installer reaches inside said bezel and pushes said movable dog member of said each spring-loaded dog assembly past said notch on said dog tower, said coiled spring then forces said dog leg to spiral around said spiral slot opening and firmly and securely clamps the material of said wall or ceiling and spring motion forces said each fixture screw out of said bezel, where said each fixture screw is screwed to secure said fixture to said bezel.

3. A mounting bracket for mounting an object to a wall or ceiling of a building structure, the mounting bracket comprising:

a. a bezel having a recess opening, a lower ledge surrounding the recess opening, and an upper ledge surrounding the lower ledge and the recess opening, the lower ledge having a plurality of apertures therethrough;

b. a plurality of spring-loaded dog assemblies, each having a dog tower formed to said lower ledge of said bezel, the dog tower having a spiral slot opening on one side which enables a movable dog member to be placed therein and rotatable up or down within the dog tower for clamping to a material of the wall or ceiling, the dog tower further having means for securing the movable dog member in a pre-mounting condition;

c. said movable dog member having a connecting section, a dog post formed at one end of the connecting section and movable within said dog tower, and a clamping dog leg formed at the other end of the connecting section, the connecting section having a protrusion which mates with said securing means on said dog tower for securing said movable dog member in the pre-mounting condition;

d. spring means inserted within said dog tower of said each spring-loaded assembly and located between a bottom of said dog tower and said dog post, where the spring means is in a compressed condition in the pre-mounting condition and in an uncompressed condition in a mounting condition;

e. a fixture positioned within said recess opening of said bezel such that the fixture rests on said lower ledge and below said upper ledge, the fixture having a plurality of slotted keyholes extending therethrough; and f. a plurality of screws, each screw having one end inserted through said each aperture on said lower ledge of said bezel and threaded into said dog post, the other end of said each screw inserted into said each slotted keyhole on said fixture which provides an axial lock for retaining and securing said fixture to said bezel;

g. whereby when an installer takes said bezel and puts said bezel in a hole in said wall or ceiling, said bezel fits flush with the surface of the wall or ceiling, the installer reaches inside said bezel and pushes said movable dog member of said each spring-loaded dog assembly past said securing means on said dog tower, said spring means then forces said dog leg to spiral around said spiral slot opening and firmly and securely clamps the material of said wall or ceiling and spring motion forces said each screw out of said bezel, where said each screw is screwed to secure said fixture to said bezel.

4. The mounting bracket in accordance with claim 3, wherein said fixture is used for a speaker system.

5. The mounting bracket in accordance with claim 3, wherein said fixture is used for a can light.

6. The mounting bracket in accordance with claim 3, wherein said bezel is generally a rectangular shape.

7. The mounting bracket in accordance with claim 3, wherein said bezel is generally a circular shape.

8. The mounting bracket in accordance with claim 3, wherein said securing means includes a notch located on said dog tower.

9. The mounting bracket in accordance with claim 3, wherein said dog post and said dog leg extend in opposite directions.

10. The mounting bracket in accordance with claim 3, wherein said spring means includes a coil spring.

11. A mounting bracket for mounting an object to a wall or ceiling of a building structure, the mounting bracket comprising:

a. a bezel having a recess opening and at least two apertures therethrough;

b. at least two spring-loaded dog assemblies, each having a dog tower attached to said bezel, the dog tower having a spiral slot opening which enables a dog member to be placed therein and rotatable up or down within the dog tower for clamping to a material of the wall or ceiling, the dog tower further having means for securing the dog member in a pre-mounting condition;

c. said dog member having a connecting section, a dog post attached at one end of the connecting section and a dog leg attached at the other end of the connecting section, the connecting section having a protrusion which mates with said securing means on said dog tower for securing said dog member in the pre-mounting condition;

d. spring means inserted within said dog tower of said each spring-loaded assembly and between a base of said dog tower and said dog post, where the spring means is in a compressed condition in the pre-mounting condition and in an uncompressed condition in a mounting condition;

e. a baffle positioned within said recess opening of said bezel such that the baffle is almost within said bezel and having a plurality of slotted openings extending therethrough; and f. at least two retaining means, each retaining means having one end inserted through said each aperture on said bezel and attached to said dog post, and the other end inserted into said each slotted opening on said baffle for retaining and securing said baffle to said bezel;

g. whereby when an installer takes said bezel and puts said bezel in a hole in said wall or ceiling, said bezel fits flush with the surface of the wall or ceiling, the installer reaches inside said bezel and pushes said dog member of said each spring-loaded dog assembly past said securing means on said dog tower, said spring means then forces said dog leg to spiral around said spiral slot opening and firmly and securely clamps the material of said wall or ceiling and spring motion forces said each retaining means out of said bezel, where said each retaining means secures said baffle to said bezel.

12. The mounting bracket in accordance with claim 11, wherein said baffle is used for a speaker system.

13. The mounting bracket in accordance with claim 11, wherein said baffle is used for a can light.

14. The mounting bracket in accordance with claim 11, wherein said bezel is generally a rectangular shape.

15. The mounting bracket in accordance with claim 11, wherein said bezel is generally a circular shape.

16. The mounting bracket in accordance with claim 11, wherein said securing means includes a notch located on said dog tower.

17. The mounting bracket in accordance with claim 11, wherein said dog post and said dog leg extend in opposite directions.

18. The mounting bracket in accordance with claim 11, wherein said each retaining means includes an elongated screw.

19. A spring-loaded dog assembly used in conjunction with a bezel and a fixture for mounting a speaker system to a wall or ceiling of a building structure, the spring-loaded dog assembly comprising:

a. a hollow cylindrical dog tower integrally formed to a bottom surface of said bezel and having a spiral slot opening on one side which enables a movable dog member to be placed therein and rotatable up or down within the dog tower for clamping to a material of the wall or ceiling, the dog tower further having a notch located on the spiral slot opening for securing the movable dog member in a pre-mounting condition;

b. said movable dog member having a connecting section, a cylindrical dog post integrally formed at one end of the connecting section and movable within said dog tower, and a clamping dog leg integrally formed at the other end of the connecting section, where the cylindrical dog post and the clamping dog leg extend in opposite directions, the connecting section having a ridge which mates with said notch on said dog tower for securing said movable dog member in the pre-mounting condition;

c. a coil spring inserted within said dog tower and located between a bottom of said dog tower and one end of said cylindrical dog post, where the coil spring is in a compressed condition in the pre-mounting condition and in an uncompressed condition in a mounting condition; and d. a fixture screw having one end inserted through an aperture on said bezel and threaded into an insert within said cylindrical dog post, and the other end inserted into a slotted keyhole on said fixture which provides an axial lock for retaining and securing said fixture to said bezel;

e. whereby when an installer takes said bezel and puts said bezel in a hole in said wall or ceiling, said bezel fits flush with the surface of the wall or ceiling, the installer reaches inside said bezel and pushes said movable dog member past said notch on said dog tower, said coiled spring then forces said dog leg to spiral around said spiral slot opening and firmly and securely clamps the material of said wall or ceiling and spring motion forces said fixture screw out of said bezel, where said fixture screw is screwed to secure said fixture to said bezel.

20. A spring-loaded dog assembly used in conjunction with a bezel and a fixture for mounting an object to a wall or ceiling of a building structure, the spring-loaded dog assembly comprising:

a. a dog tower attached to said bezel and having a spiral slot opening on one side which enables a movable dog member to be placed therein and rotatable up or down within the dog tower for clamping to a material of the wall or ceiling, the dog tower further having means for securing the movable dog member in a pre-mounting condition;

b. said movable dog member having a connecting section, a dog post formed at one end of the connecting section and movable within said dog tower, and a clamping dog leg formed at the other end of the connecting section, the connecting section having a protrusion which mates with said securing means on said dog tower for securing said movable dog member in the pre-mounting condition;

c. spring means inserted within said dog tower and located between a bottom of said dog tower and said dog post, where the spring means is in a compressed condition in the pre-mounting condition and in an uncompressed condition in a mounting condition; and d. a screw having one end inserted through an aperture on said bezel and threaded into said dog post, and the other end inserted into a slotted keyhole on said fixture which provides an axial lock for retaining and securing said fixture to said bezel;

e. whereby when an installer takes said bezel and puts said bezel in a hole in said wall or ceiling, said bezel fits flush with the surface of the wall or ceiling, the installer reaches inside said bezel and pushes said movable dog member past said securing means on said dog tower, said spring means then forces said dog leg to spiral around said spiral slot opening and firmly and securely clamps the material of said wall or ceiling and spring motion forces said screw out of said bezel, where said screw is screwed to secure said fixture to said bezel.

21. The spring-loaded dog assembly in accordance with claim 20, wherein said securing means includes a notch located on said dog tower.

22. The spring-loaded dog assembly in accordance with claim 20, wherein said dog post and said dog leg extend in opposite directions.

23. The spring-loaded dog assembly in accordance with claim 20, wherein said spring means includes a coil spring.

24. A spring-loaded dog assembly used in conjunction with a bezel and a baffle for mounting an object to a wall or ceiling of a building structure, the spring-loaded dog assembly comprising:

a. a dog tower attached to said bezel and having a spiral slot opening which enables a dog member to be placed therein and rotatable up or down within the dog tower for clamping to a material of the wall or ceiling, the dog tower further having means for securing the dog member in a pre-mounting condition;
b. said dog member having a connecting section, a dog post attached at one end of the connecting section and a dog leg attached at the other end of the connecting section, the connecting section having a protrusion which mates with said securing means on said dog tower for securing said dog member in the pre-mounting condition;
c. spring means inserted within said dog tower and between a base of said dog tower and said dog post, where the spring means is in a compressed condition in the pre-mounting condition and in an uncompressed condition in a mounting condition; and
d. retaining means having one end inserted through an aperture on said bezel and attached said dog post, and the other end inserted into a slotted opening on said baffle for retaining and securing said baffle to said bezel;
e. whereby when an installer takes said bezel and puts said bezel in a hole in said wall or ceiling, said bezel fits flush with the surface of the wall or ceiling, the installer reaches inside said bezel and pushes said dog member past said securing means on said dog tower, said spring means then forces said dog leg to spiral around said spiral slot opening and firmly and securely clamps the material of said wall or ceiling and spring motion forces said retaining means out of said bezel, where said retaining means secures said baffle to said bezel.

25. The spring-loaded dog assembly in accordance with claim 24, wherein said securing means includes a notch located on said dog tower.

26. The spring-loaded dog assembly in accordance with claim 24, wherein said dog post and said dog leg extend in opposite directions.

27. The spring-loaded dog assembly in accordance with claim 24, wherein said retaining means includes an elongated screw.

* * * * *